(12) United States Patent
Rolin

(10) Patent No.: US 6,825,754 B1
(45) Date of Patent: *Nov. 30, 2004

(54) RADIO FREQUENCY IDENTIFICATION DEVICE FOR INCREASING TAG ACTIVATION DISTANCE AND METHOD THEREOF

(75) Inventor: John Howard Rolin, Morgan Hill, CA (US)

(73) Assignee: Motorola, Inc., Schaumburg, IL (US)

( * ) Notice: Subject to any disclaimer, the term of this patent is extended or adjusted under 35 U.S.C. 154(b) by 836 days.

This patent is subject to a terminal disclaimer.

(21) Appl. No.: 09/659,807

(22) Filed: Sep. 11, 2000

(51) Int. Cl.[7] ................................................ H04Q 5/22
(52) U.S. Cl. ................................................ 340/10.34
(58) Field of Search .......................... 340/10.34, 10.31, 340/10.32, 10.33, 572.1, 572.3, 572.2, 572.4, 10.51, 10.6; 235/492, 491, 439

(56) References Cited

U.S. PATENT DOCUMENTS 5,854,480 A * 12/1998 Noto ........................... 235/492
6,229,442 B1 * 5/2001 Rolin et al. .............. 340/572.1
6,411,213 B1   6/2002 Vega
6,611,199 B1   8/2003 Geiszler

* cited by examiner

Primary Examiner—Michael Horabik
Assistant Examiner—William Bangachon
(74) Attorney, Agent, or Firm—Terri S. Hughes; Thomas V. Miller

(57) ABSTRACT

A radio frequency identification ("RFID") device for increasing tag activation distance comprises a first exciter electrode (2), a second exciter electrode (21), a dielectric substrate (3), and a first exciter voltage source (4). The second exciter electrode is positioned behind the first exciter electrode. The dielectric substrate is disposed between the first and second exciter electrodes. The dielectric substrate isolates the first exciter electrode from the second exciter electrode. The first exciter voltage source is coupled to at least one of the first exciter electrode and the second exciter electrode.

22 Claims, 13 Drawing Sheets

RADIO FREQUENCY IDENTIFICATION DEVICE FOR INCREASING TAG ACTIVATION DISTANCE AND METHOD THEREOF

CROSS-REFERENCES TO RELATED APPLICATIONS

This application is related to U.S. Pat. No. 6,611,199, filed Apr. 16, 1998, by Geiszler et al., titled "Remotely Powered Electronic Tag with Plural Electrostatic Antennas and Associated Exciter/Reader and Related Method" which is commonly assigned to Motorola, Inc. the disclosure of which is hereby incorporated by reference, verbatim and with the same effect as though it were fully and completely set forth herein.

Additionally, this application is related to U.S. Pat. No. 6,411,213, filed Feb. 27, 1998, by Vega et al., titled Radio Frequency Identification Tag System Using Tags Arranged for Coupling to Ground" which is commonly assigned to Motorola, Inc. the disclosure of which is hereby incorporated by reference, verbatim and with the same effect as though it were fully and completely set forth herein.

Additionally, this application related to U.S. Pat. No. 6,229,442, filed Mar. 14, 2000, by Rolin et al., titled "Radio Frequency Identification Device Having Displacement Current Control and Method Thereof" which is commonly assigned to Motorola, Inc. the disclosure of which is hereby incorporated by reference, verbatim and with the same effect as though it were fully and completely set forth herein.

FIELD OF THE INVENTION

The present invention relates generally to communication devices, and more particularly to radio frequency identification (RFID) devices providing increased tag activation distances.

BACKGROUND OF THE INVENTION

In general, an RFID system consists of one or more tags, a tag reader, and a host computer system. Tags are devices that can come in many sizes and form factors, but are usually small and lightweight. Tags are commonly used as portable data devices that wirelessly communicate with RFID readers at distances ranging from a few millimeters to several meters. The information stored in a tag can be used, for example, to identify an individual or object carrying the tag.

RFID technology is used in a variety of applications because of its convenience and flexibility. An example application for RFID technology is a building security system. As part of a building security system, RFID systems are used to grant access only to individuals carrying authorized tags (or cards). When an individual places their card in the vicinity of the reader, the reader interrogates the card and obtains identification information stored in the card. After further processing, the reader communicates the individual's identification ("ID") code to a host computer in the security system. If the ID code received by the host computer system is authorized, the door is unlocked to permit access to the building.

RFID systems are also used to detect specific items and link those items with other information and events. RFID systems can be used, for example, to track products being built in a factory, to trigger manufacturing steps to occur, to assist in inventory control, etc. Read-only tags are ones in which the data is programmed once, and the tag only sends the stored information to the reader. Read-write tags have the ability to be reprogrammed to suit the needs of the application. Therefore, read-write tags can be used as portable databases, eliminating the need for central databases.

Most RFID tags contain functional electronics in the form of an integrated circuit, or IC, to store and process data, and to perform communication functions. RFID tags also contain an antenna, which is used as the radio frequency interface with the reader. The IC requires power to operate, which can be supplied by a battery. Most applications, however, require tags to be small and inexpensive, so batteryless, or "passive", tags are in very wide use. Passive tags receive energy from the radio frequency ("RF") field generated by a reader, and the IC converts the RF to direct current ("DC") operating power for itself. Once operating, the IC communicates with the reader, which has an antenna system for transmission and reception of signals. Power and data are transferred between tag and reader through one or more antennae in each device. The reader antenna used to couple power and/or information from the reader to the tag is called the exciter antenna. The reader antenna used to receive information from the tag is called the receive antenna.

A key performance parameter of all RFID systems is read range. Read range is the distance between the card and reader at which the reader captures the data transmitted by the card. Read range is a function of two factors. Tag activation distance is the distance between the tag and the reader at which the tag receives sufficient energy to power the IC. The tag can then begin to send data to the reader. Receiver sensitivity controls the distance at which the reader can receive the transmitted data. If receiver sensitivity is low or is compromised by interfering signals the tag must be moved closer to the reader until the data signal strength exceeds the reader receiver sensitivity. Internally or externally generated noise may effectively reduce the sensitivity of the receiver. Thus the read range of an RFID system can never be greater than the tag activation distance.

Some tag-reader systems communicate via magnetic fields, while other types of systems communicate via electric fields. Electric field tags offer advantages in cost, size, weight and flexibility compared with magnetic field tags. Many applications demand small, compact and inexpensive readers, as well. Shrinking the size of electric field RFID readers, however, presents unique design challenges. Without addressing these challenges, reader performance is significantly impaired.

Two types of electric field RFID reader and tag systems exist, and are referred to as monopole and dipole systems. A monopole electric field RFID reader, or RFID device, has a single exciter antenna, or exciter electrode, driven by a voltage source that is referenced to an impedance that is common with the environment ("common impedance") in which an electric field tag is being used. The tag has two antennae, or electrodes, the first of which is preferentially coupled to the impedance that is common with the RFID device. For example, the preferential coupling impedance may be formed by a person holding the tag, while the common impedance may be formed by earth ground. The total return impedance, defined as the sum of the preferential coupling impedance and the common impedance, may be resistive, capacitive, inductive, or any combination thereof. When the tag is close enough to the RFID device, displacement current will flow from the exciter electrode to the second tag electrode through the capacitance that exists between them. Current will then flow through the tag IC, and back to the reference terminal of the exciter voltage source through the total return impedance. If sufficient current flows, the tag IC will become activated. In general, the total return impedance is much lower than the reactance of the very small capacitance that exists between the exciter electrode and the second tag electrode. Therefore, the displacement current that activates the tag is limited primarily by the small capacitance between the reader and the tag.

Dipole electric field RFID devices contain two exciter electrodes whose voltages are opposite in polarity but balanced about a common impedance path such as earth ground or the chassis of equipment. Dipole systems do not require preferential coupling of one tag electrode to a common impedance of the system, although preferential coupling may be utilized in some cases. Because the pair of tag electrodes is coupled to the pair of RFID device exciter electrodes through a series combination of two small capacitance values, the effective tag-reader coupling impedance is much larger in dipole systems than in monopole systems. Therefore, the tag activation distance of a dipole electric field RFID system is substantially smaller than that of a similarly sized monopole electric field RFID system. Monopole electric field RFID systems are used in more applications than are dipole systems because of the improved coupling efficiency and large tag activation distance that is achievable.

For simplicity, the following discussion will describe electric field RFID devices in terms of monopole systems, even though the concepts also apply to dipole systems. For clarity, only the excitation function of electric field RFID systems will be described. Other functional elements that are required for full RFID device functionality, such as the receive electrode(s), receiver, demodulator, decoder, processor, I/O circuitry, etc., are understood by those skilled in the art, and are not relevant to this discussion.

FIG. 1 is a simplified side pictorial/schematic view of a system containing the electric field RFID device 14 and the tag 5, illustrating the excitation portion of the system. In FIG. 1, the exciter antenna assembly 1 is comprised of the exciter electrode 2 (e.g., antenna plate, etc.) which is illustrated as an electrically conductive layer, or sheet, disposed upon the dielectric substrate 3, which can be fabricated using well-known technologies such as, but not limited to, printed circuit board technology. The exciter voltage source 4 generates a high alternating current ("AC") voltage that is connected to exciter electrode 2. Exciter electrode 2, driven by exciter voltage source 4, causes an AC electric field to be radiated outward toward tag 5. When tag 5 is close enough to exciter electrode 2, the displacement current 6 flows through the coupling capacitance formed between exciter electrode 2 and the tag electrode 52. Displacement current 6 becomes a conduction current and flows through the IC 51 of tag 5, the tag electrode 53, the preferential coupling impedance 30, the common impedance 7 (such as, but not limited to, earth ground), and the electric field RFID device reference connection 9, ultimately returning to exciter voltage source 4 at the exciter voltage source return node 91. If sufficient current is coupled from exciter electrode 2 to tag 5, tag 5 will begin to function. Therefore, displacement current 6 provides operating power for tag 5. Relatively high voltage levels must be present on exciter electrode 2 in order to produce an adequate magnitude of displacement current 6 when tag 5 is at long distances from exciter electrode 2. Electric field RFID device reference connection 9 and common impedance 7 are shown connected to the system ground 8. It should be noted that FIG. 1 is not drawn to physical scale, that is, tag 5 is typically positioned at a much greater distance from the exciter electrode 2 than is suggested in FIG. 1. Tag activation distances can range from a few inches to several feet depending upon the size of the tag electrodes, the size of the electric field RFID device exciter electrode and the exciter voltage. Although a flat planar exciter electrode is illustrated in FIG. A, surfaces having complex shapes can also be used. A receive electrode (not shown) is often located near the exciter electrode 2 for the purpose of receiving signals from tags.

The charge distribution for one phase of the exciter voltage source is illustrated in FIG. 1. A high concentration of positive charge appears on the outer surface (closest to tag 5) of exciter electrode 2, while a high concentration of negative charge appears on tag electrode 52, which is nearest to exciter electrode 2. When the phase of the exciter voltage source reverses, the polarities of the illustrated charge also reverse. FIG. 1 represents an idealized case, which is often not realizable in many practical applications.

In many practical systems, other electrically conductive surfaces and elements are usually in the vicinity of exciter electrode and the tag. This can occur, for example, as a result of conductive materials being present in or behind the surface to which the exciter electrode assembly is mounted, as shown in FIG. 2. In capacitively coupled systems, this causes a re-distribution of the electric charges and associated electric fields. The presence of the electrically conductive surface 11 behind exciter electrode 2 causes the displacement current 19 to flow from exciter electrode 2 to electrically conductive surface 11, and pulls the electric field lines from exciter electrode 2 towards it, reducing the electric field strength that radiates outward towards tag 5. This reduces the amount of charge that is available on the outer surface of exciter electrode 2 for coupling to tag 5, thereby causing a reduction of the coupled power. The reduction of charge on the outer surface of exciter electrode 2 is indicated by fewer + charge symbols on the outer surface of exciter electrode 2, when compared to the inner surface of exciter electrode 2, and as compared to the outer surface of exciter electrode 2 in the idealized case of FIG. 1. Tag 5 requires minimum values of voltage and current to become activated, and the maximum distance at which tag 5 becomes activated is referred to as the tag activation distance. However, if power coupled to tag 5 is reduced by the presence of nearby conducting surfaces, the tag will no longer receive enough power to be activated. As a result, tag 5 must be located closer to exciter electrode 2 in order to receive sufficient power for activation.

The net effect is that the tag activation distance is reduced by the presence of nearby conductive surfaces, as illustrated in FIG. 3. Exciter electrode 2 is disposed within the enclosure 23, which is attached to the mounting surface 200. Mounting surface 200 may be a wall, table, shelf, etc. For mounting surfaces composed of dielectric materials, the first maximum tag activation boundary 100 is obtained. Tags may be activated at and within the space defined by this boundary. Although first maximum tag activation boundary 100 may also extend below mounting surface 200, it is not illustrated for clarity because in many cases, a tag cannot be physically positioned in this region. Next, consider the case in which mounting surface 200 is composed of an electrically conductive material. Electric charge is redistributed and becomes concentrated between exciter electrode 2 and mounting surface 200, thereby reducing the electric charge available for coupling to tags. The result is depicted by the second maximum tag activation boundary 101. The tag activation distance in front of and to the sides of exciter electrode 2 is reduced substantially. The electric field lines radiated by exciter electrode 2 terminate on mounting surface 200 because is conductive, and second maximum tag activation boundary 101 does not extend below mounting surface 200.

Other types of nearby conducting surfaces are also present in many practical implementations of the reader. It is often desired that readers be as small as possible, and constructing such compact readers means that some or all of the functional electronics must be contained within the same enclosure as the exciter electrode.

FIG. 4 is an example of the electric field RFID system 13 having the compact electric field RFID device 14. Electric field RFID device 14 is composed of two basic elements, an exciter electrode (e.g., antenna, plate etc.)2 and the electronic circuitry 15. Electric field RFID device 14 may be any part of an RFID reader system containing tag excitation circuitry, such as, a tag reader, a tag writer, a tag reader/writer, a tag excitation device (in which the circuitry that performs the tag reading function is located in a separate unit), or any combination thereof. Exciter electrode 2 is a sheet of electrically conductive material. Electronic circuitry 15 contains all of the functional circuitry required to drive exciter electrode 2, communicate information between tag 5 and electric field RFID device 14, and exchange information with the host computer system 17 via the input/output ("I/O") cable 16. Power can be provided to electric field RFID device 14 by host computer system 17 via I/O cable 16, or electric field RFID device 14 can contain a portable power source (not shown). Electronic circuitry 15 is assembled on the substrate 18 comprised of a dielectric material, such as, epoxy glass printed circuit board (PCB). Alternatively, substrate 18 may be made of a wide variety of materials, such as, polymer sheets or films, paper or cardboard, ceramic, etc. Components used in electronic circuitry 15 are interconnected by the conductors 40 on substrate 18. The conductors are formed of metals, metal foil, metal film, electrically conductive inks or paints, etc., and may be constructed using any suitable means, such as deposition and etching.

The presence of the additional wiring and electronic components forms conductive surfaces near the exciter electrode as described previously, and tag activation distance will be reduced from the idealized case illustrated in FIG. 1 as a result. Furthermore, the close proximity of the reader circuitry will cause displacement currents to flow from the exciter electrode into the nearby circuitry. The injected displacement current 19 that flows through sensitive circuits in electronic circuitry 15 can significantly reduce sensitivity to the tag signal. This reduction of read path sensitivity causes the read range to drop to levels well below that of the tag activation distance—70% decreases have been observed in some cases. In addition, the displacement current can cause abnormal functional behavior and can increase unintentional conducted and/or radiated emissions from the reader, posing radio frequency compliance problems.

To contend with the adverse effects of internally injected displacement current, a displacement current control surface may be used quite successfully as described in U.S. Pat. No. 6,229,442. FIG. 5 illustrates the introduction of the displacement current control surface 20 into the system of FIG. 4. However, the introduction of a displacement current control surface can increase the overall area of conductive surface(s) near the exciter electrode even further. The increase in nearby conductive surface area can cause a further reduction in tag activation distance, as indicated by very few + charge symbols on the outside of exciter electrode 2. The more compact the reader must be, the more a displacement current control surface is needed to preserve receive sensitivity. This comes, however at the loss of tag activation distance. With the inclusion of a displacement current control surface, it is quite possible for the receive sensitivity to yield a maximum read distance capability that is greater than the tag activation distance. However, the effective system read range can never be greater than the tag activation distance. Therefore, a loss in tag activation distance will also reduce effective system read range.

The decrease in tag activation distance that occurs as a result of nearby conductive surfaces can be overcome by increasing the exciter voltage. However, this usually comes at the expense of increased reader power consumption and increased internal operating temperatures, thereby limiting the operating temperature range of the product or compromising its reliability. Increasing the exciter voltage can also increase internal noise within the reader, potentially reducing receive path sensitivity. Creating circuits to increase the exciter voltage may also increase conducted and/or radiated emissions, posing regulatory compliance difficulties.

Another compensation method is to increase the area of the exciter electrode. This approach has the disadvantage of increasing RFID device the package size. Alternatively, reader packaging can be made larger such that the closest nearby conductive surfaces are maintained at greater distances from the exciter electrode. The reader could be packaged in two physical enclosures, allowing the idealized case to be more closely approximated. Still, the exciter electrode enclosure would have to be large enough to render the effects of conductive materials in the mounting surface to be acceptably small. Larger single-piece readers or even two-piece readers can easily be more costly and weigh more; and incur additional shipping cost. If utilized, these compensation methods can cause the resulting RFID devices to be unsuited for many applications because of excessive product size, cost, installation difficulty, etc.

Thus, there exists a need to provide an apparatus and method for increasing the effective electric field strength of RFID devices to activate RFID tags at greater distances. A low-cost solution that enables compact electric field RFID devices to function well and predictably in a wide variety of applications is desired.

BRIEF DESCRIPTION OF THE DRAWINGS

Various embodiments of the invention are now described, by way of example only with reference to the accompanying drawings in which.

DETAILED DESCRIPTION OF THE PREFERRED EMBODIMENTS

Radio frequency identification ("RFID") systems based on electric field coupling are affected by the ubiquitous parasitic capacitances inherent in the presence of conducting, semi-conducting and non-conducting materials present in the environment and required to build practical devices. The effects of these considerations are ameliorated by the present invention disclosed below. The following embodiments are described as being applied to monopole electric field RFID devices, although the concepts can be applied to dipole electric field RFID devices as well.

Figure 1:
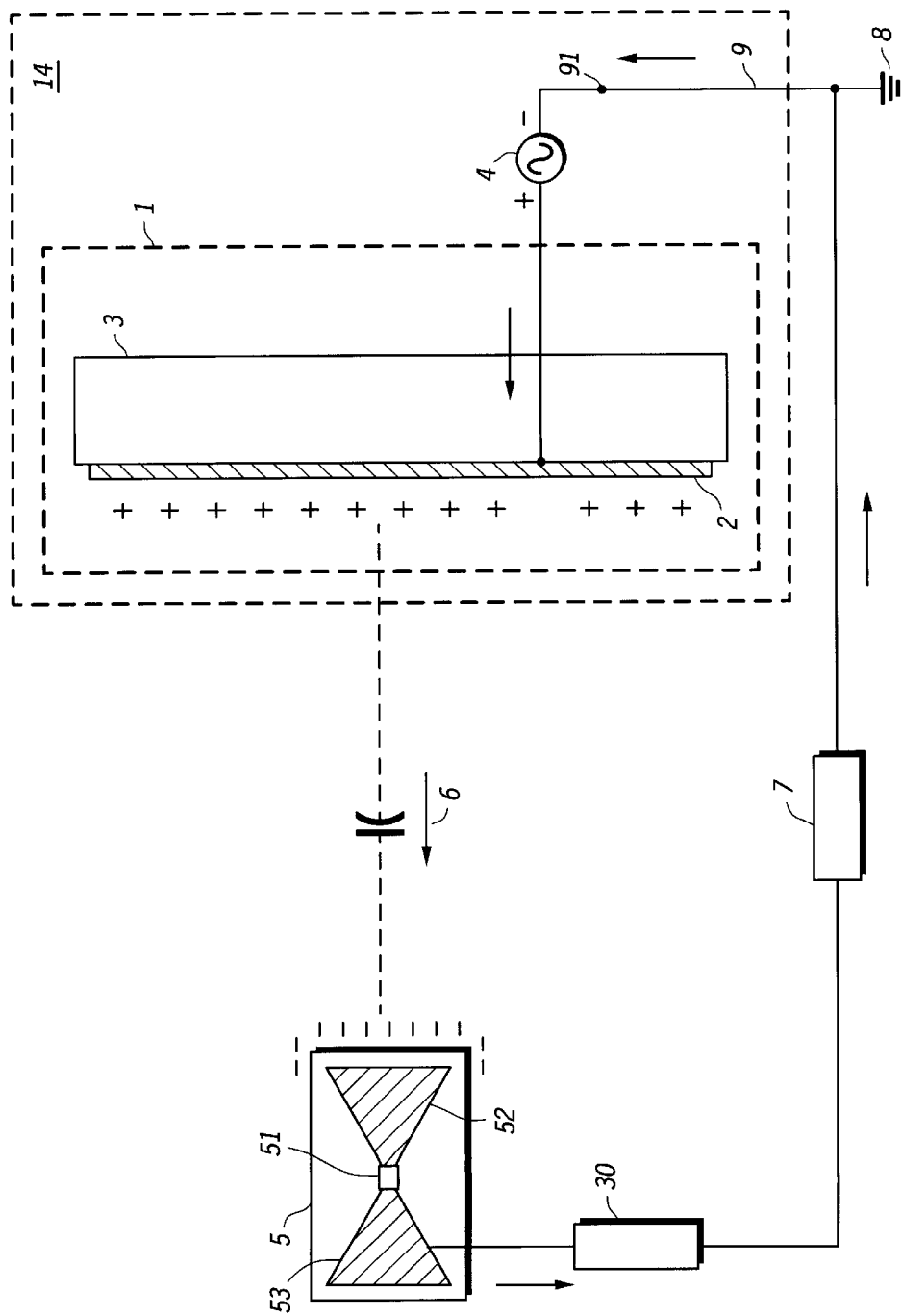
FIG. 1 illustrates a simplified side pictorial/schematic view of the excitation portion of a system containing an electric field RFID device and tag.
Figure 2:
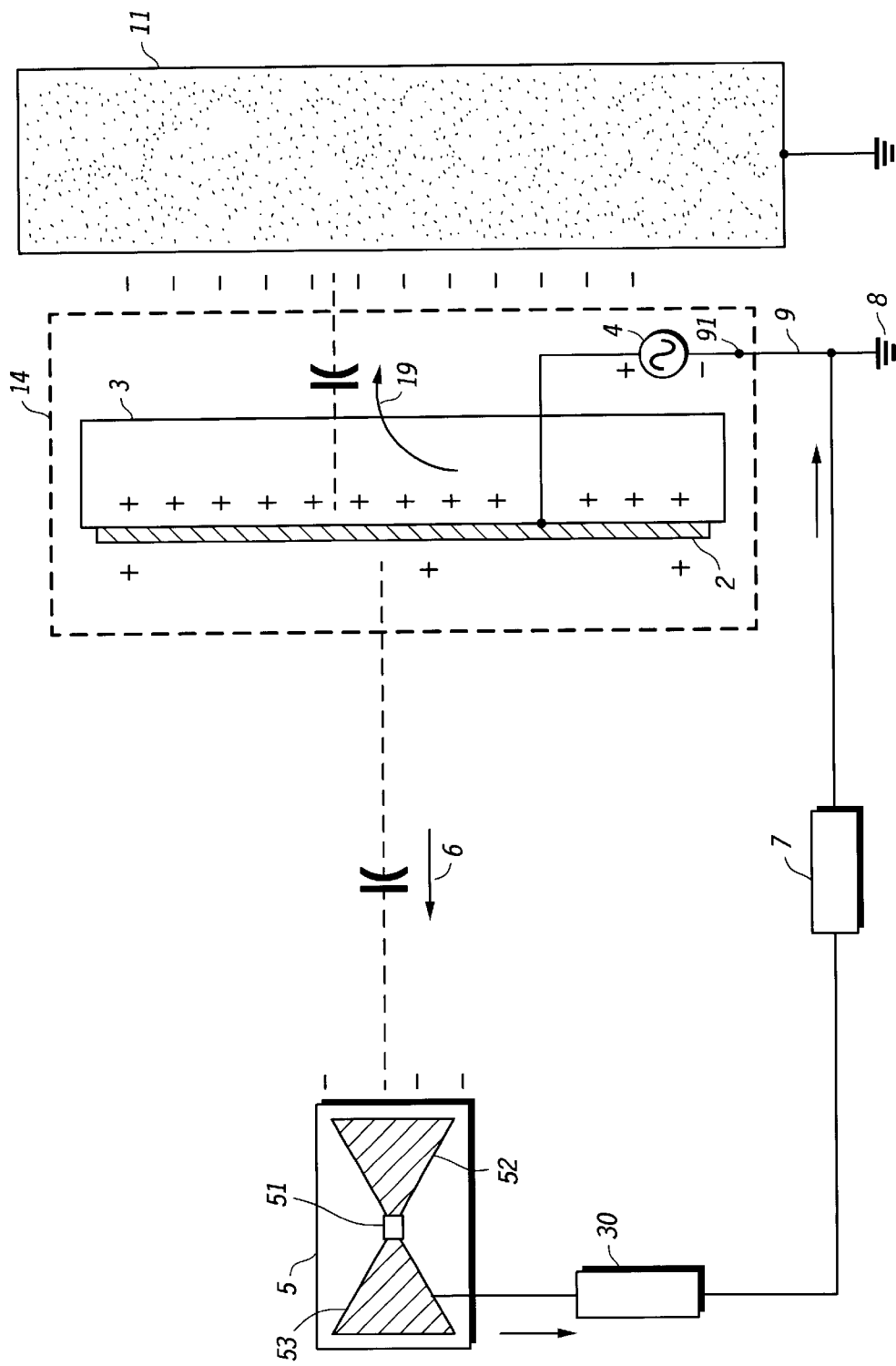
FIG. 2 illustrates the introduction of conductive materials near the system of FIG. 1.
Figure 3:
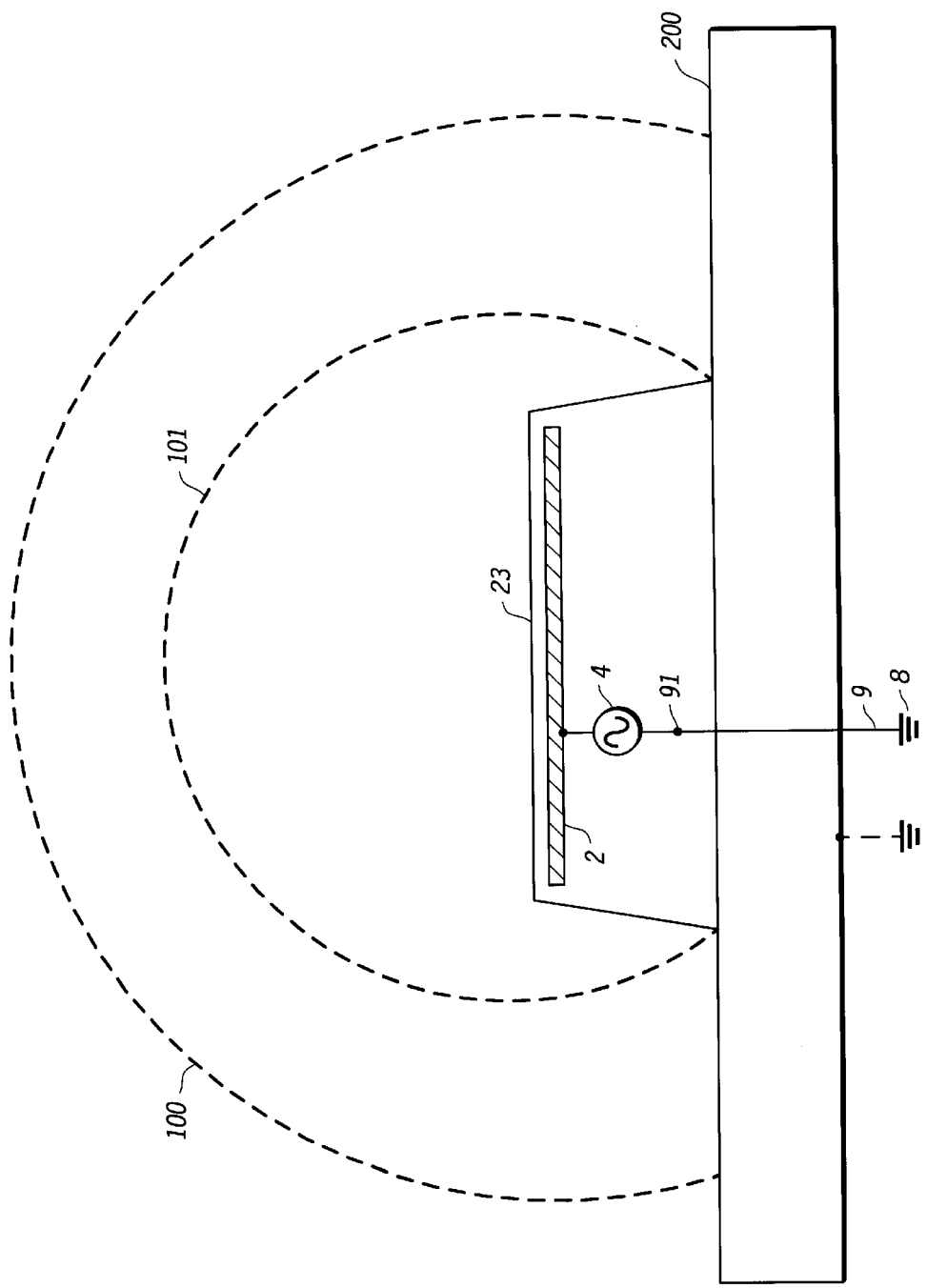
FIG. 3 illustrates the net effect upon tag activation distance resulting from the presence of nearby conductive surfaces.
Figure 4:
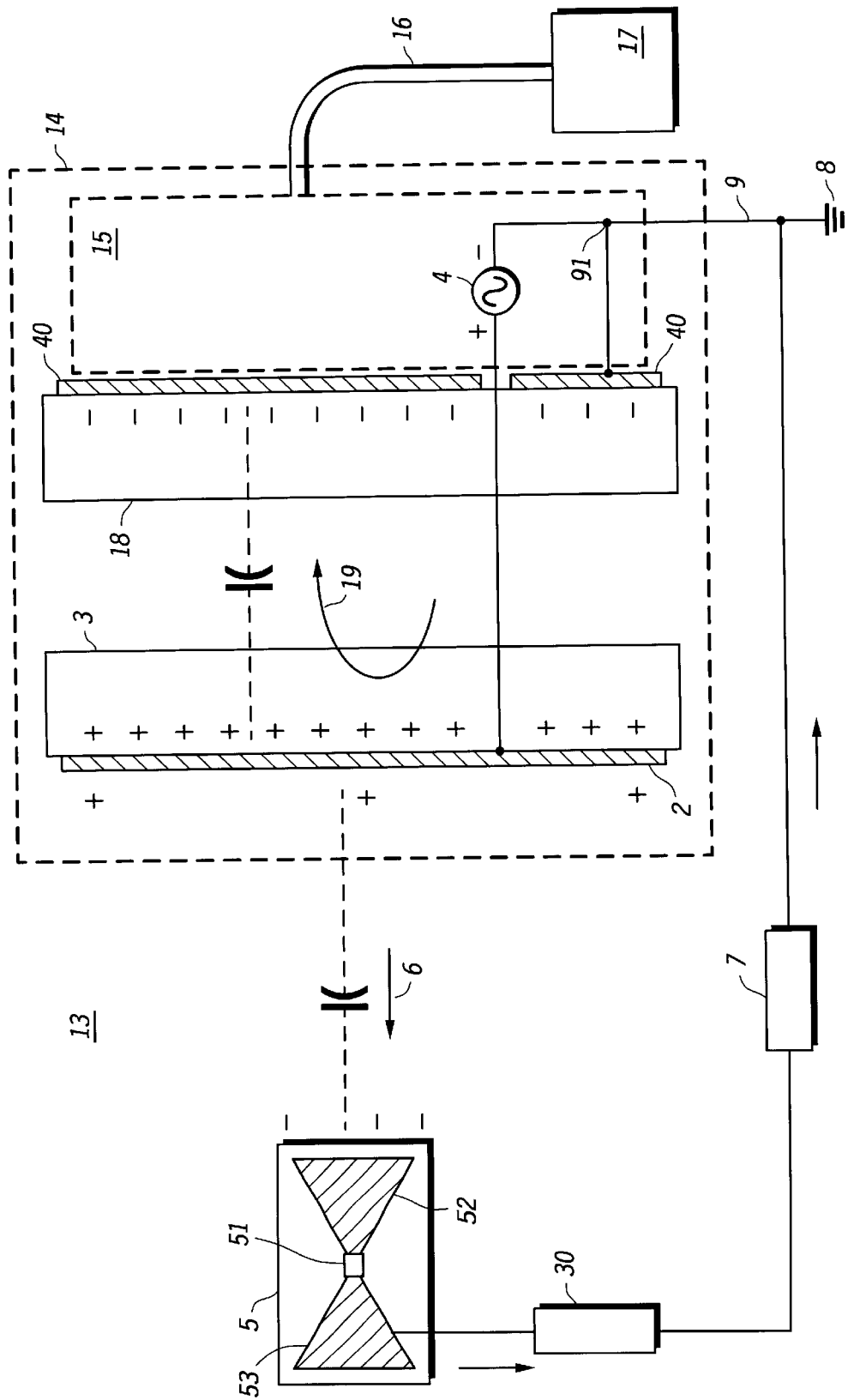
FIG. 4 illustrates an electric field RFID system having a compact electric field RFID device.
Figure 5:
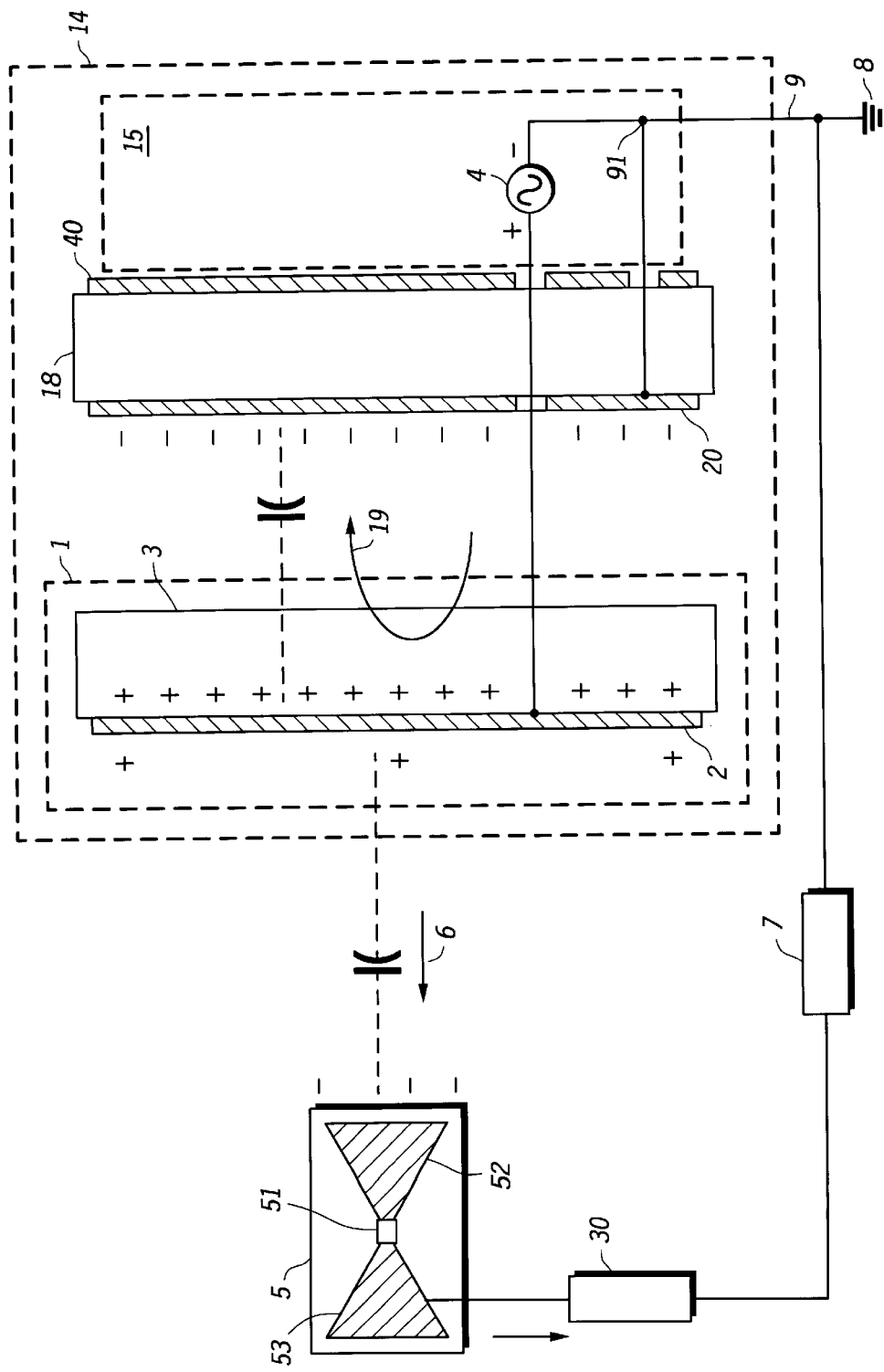
FIG. 5 illustrates the introduction of a displacement current control surface into the system of FIG. 4.
Figure 6:
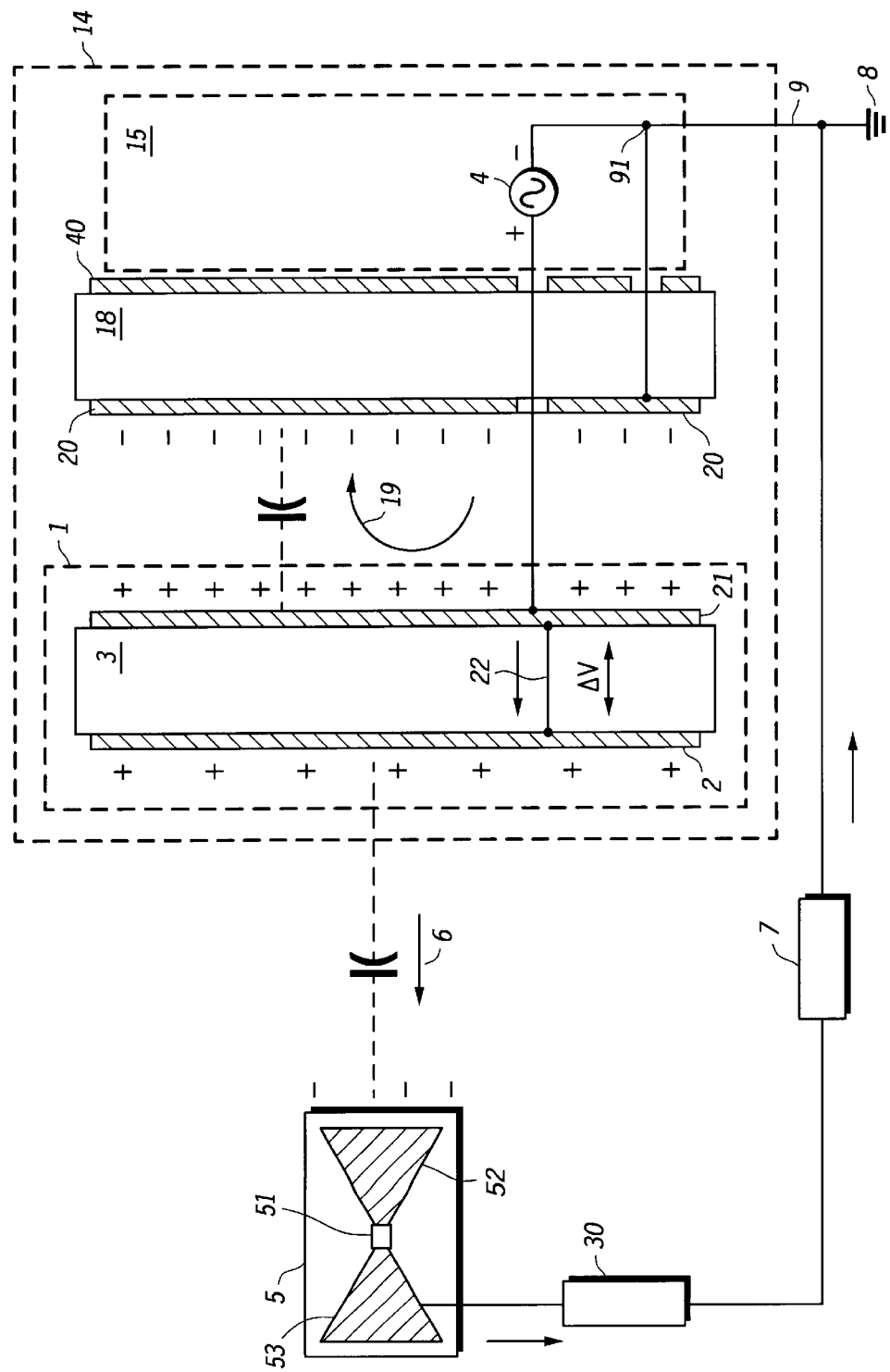
FIG. 6 illustrates the introduction of a second exciter electrode to the RFID device of FIG. 5 that is electrically coupled to an exciter voltage source in accordance with a first embodiment of the present invention.

Referring now to the first preferred embodiment of the present invention, FIG. 6 illustrates the addition of the second exciter electrode 21 to the electric field RFID device of FIG. 5. Second exciter electrode 21 is separated from and positioned behind first exciter electrode 2. The separation between first exciter electrode 2 and second exciter electrode 21 is formed by dielectric substrate 3 that is disposed between them, and can be a material such as but not limited to a glass-epoxy printed circuit board. First exciter electrode 2 and second exciter electrode 21 are connected together by a conductor 22 so that they are each driven by exciter voltage source 4, and are therefore at the same alternating current ("AC") potential and phase. The resulting charge distribution across the surface of second exciter electrode 21 that is adjacent to displacement current control surface 20 is represented in FIG. 6 by the + and −charge symbols on each surface respectively. The magnitude of charge density is represented by the number of + and −charge symbols on each surface, and is similar to that illustrated between exciter electrode 2 and displacement current control surface 20 in FIG. 5.

Although first exciter electrode 2 and second exciter electrode 21 in FIG. 6 are in two spatial locations, they may be driven by the same potential, so that the differential voltage between them, ₃ V, is zero. Because ₃ V is zero, the charge density between the adjacent surfaces of first exciter electrode 2 and second exciter electrode 21 is also zero. Other than electric fringe fields that exist at the narrow outer edges of exciter electrode 2, essentially all of the internal displacement current 19 flows from the exciter electrode 21 rather than exciter electrode 2. As a result, second exciter electrode 21 buffers first exciter electrode 2 from the loading effects of displacement current control surface 20. Because of this buffering action and that the first exciter electrode 2 is located in front of the second exciter electrode 21 (i.e., the first exciter electrode 2 being positioned farther away from displacement current control surface 20 than the second exciter electrode 21), a higher charge density can be developed on the outer surface of first exciter electrode 2. This is represented by the increased number of +charge symbols on the outer surface of first exciter electrode 2 in FIG. 6 than are present on the outer surface of exciter electrode 2 in FIG. 5. The increase of available charge on the outer surface of first exciter electrode 2 in FIG. 6 enables an increased level of induced charge on tag 5. The higher charge density is represented by a larger number of −charge symbols on tag electrode 52 than are present in FIG. 5. The increased charge as a result of the present invention increases the electric field strength in front of the reader, thereby increasing tag activation distance.

Figure 7:
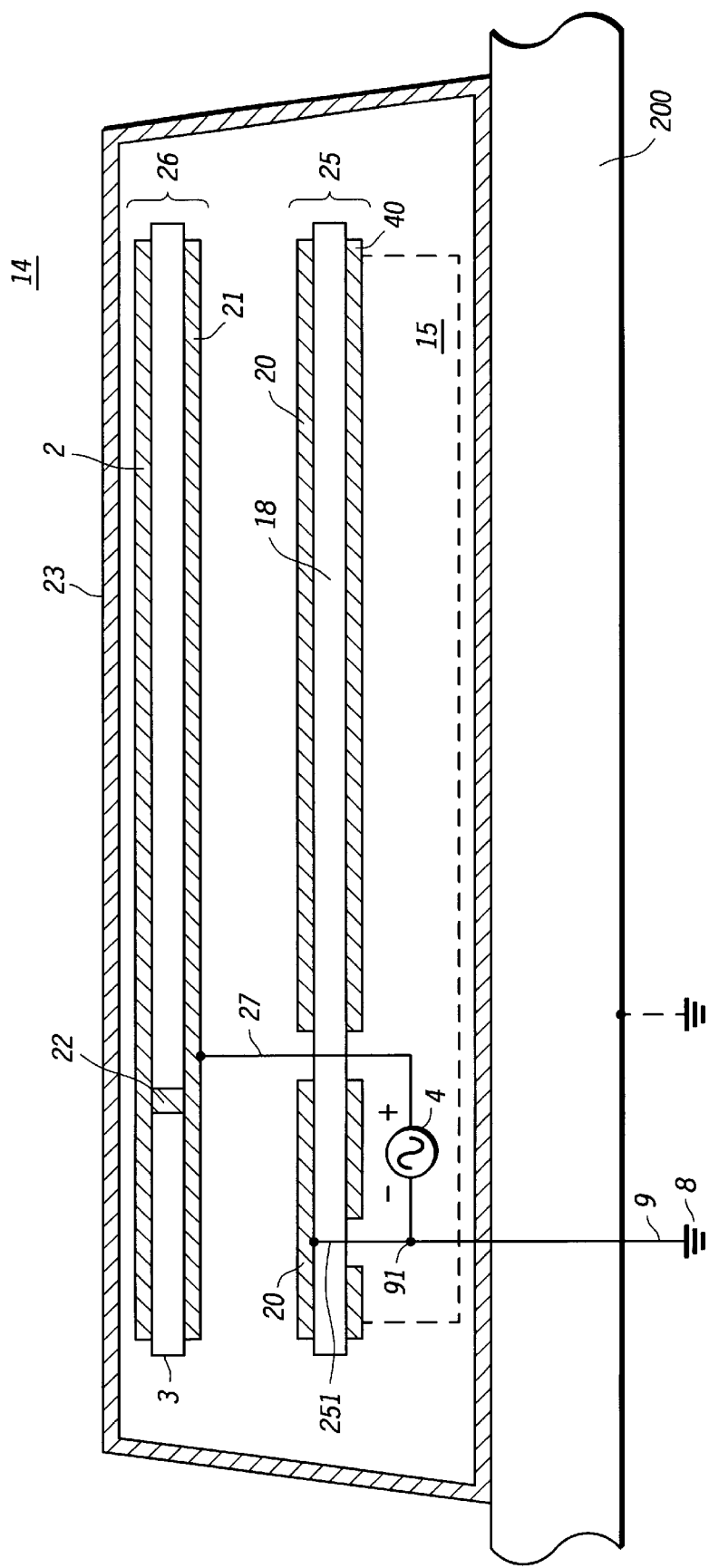
FIG. 7 illustrates the mechanical packaging of FIG. 6 in accordance with the first embodiment of the present invention.

The mechanical packaging of the first preferred embodiment of the invention in the RFID device is more clearly illustrated in FIG. 7. Enclosure 23 contains all functional elements of electric field RFID device 14, and is entirely or partially composed of a dielectric material. The enclosure is attached to mounting surface 200, which may or may not be at external ground potential. The RFID device electronics printed circuit board ("PCB") 25 is comprised of substrate 18, electronic circuitry 15, conductors 40, and displacement current control surface 20. Electronic circuitry 15 occupies the region within the dotted line on the back of RFID device electronics PCB 25, and includes exciter voltage source 4. Exciter voltage source return node 91 is electrically coupled to displacement current control surface 20 through the conductor 251, which may be implemented as a wire, a conductive via on RFID device electronics PCB 25, or any other suitable means. Exciter voltage source return node 91 is usually electrically connected to electric field RFID device circuit common (not shown) and external system ground 8, all of which terminate on RFID device electronics PCB 25.

An antenna PCB 26 comprises a substrate 3, a first exciter electrode 2, and a second exciter electrode 21. First exciter electrode 2 and second exciter electrode 21 are shown as two electrically conductive layers that are disposed on substrate 3. First exciter electrode 2 and second exciter electrode 21 are electrically coupled by conductor 22, which is illustrated as a PCB electrically conductive via. Conductor 22 can be implemented as a wire or any other suitable means. Second exciter electrode 21 is electrically coupled to exciter voltage source 4 by the conductor 27, which can be a wire, connector, or any other suitable means. Antenna PCB 26 is positioned in front of RFID device electronics PCB 25 such that first exciter electrode 2 is closest to the front of enclosure 23, to which RFID tags (not shown) are presented. The mechanical means for spacing antenna PCB 26 from RFID device electronics PCB 25 is not shown, but may be implemented through the use of a wide variety of materials and fasteners. It is implied in FIG. 7 that antenna PCB 26 is not electrically coupled through mechanical spacers to RFID device electronics PCB 25, although this can be done if desired. For example, conductor 27 may be implemented as a metal spacer or standoff between antenna PCB 26 and RFID device electronics PCB 25. In general, however, minimizing electrical conductors in the vicinity of the exciter electrodes is preferred in order to maximize tag activation distance.

FIG. 7 illustrates, for example, that the present invention can be implemented on existing materials and assemblies of an electric field RFID device with minimal impact. The addition of second exciter electrode 21 to antenna PCB 26 as a conductor layer does not increase the overall assembly thickness. Adding the conductor layer that forms second exciter electrode 21 is a commonly available technique in printed circuit manufacturing processes, and increases cost a negligible amount. Therefore, the use of the present invention can be implemented at essentially no increase in cost or size, and does not require exciter circuit redesign. Although it might be considered that the exciter electrode area has been doubled, this is not the case because the two exciter electrodes are not coplanar, but are stacked instead. Because second exciter electrode 21 "hides" behind first exciter electrode 2, there is no increase in electric field RFID device package area.

The implementation of the present invention illustrated in FIG. 7 and described above has produced improvements in tag activation distance ranging from 5% to 25%, depending upon the size of the exciter electrodes 2 and 21 and displacement current control surface 20, the spacing between first exciter electrode 2 and second exciter electrode 21, and the distance between second exciter electrode 21 and displacement current control surface 20. Computer simulations have shown that implementing the present invention in a manner that increases electric field RFID device package thickness can yield further improvements in tag activation distance. Although increasing product thickness may be undesirable, the incremental improvement in tag activation distance is several hundred percent greater than the increase in electric field RFID device package thickness.

Figure 8:
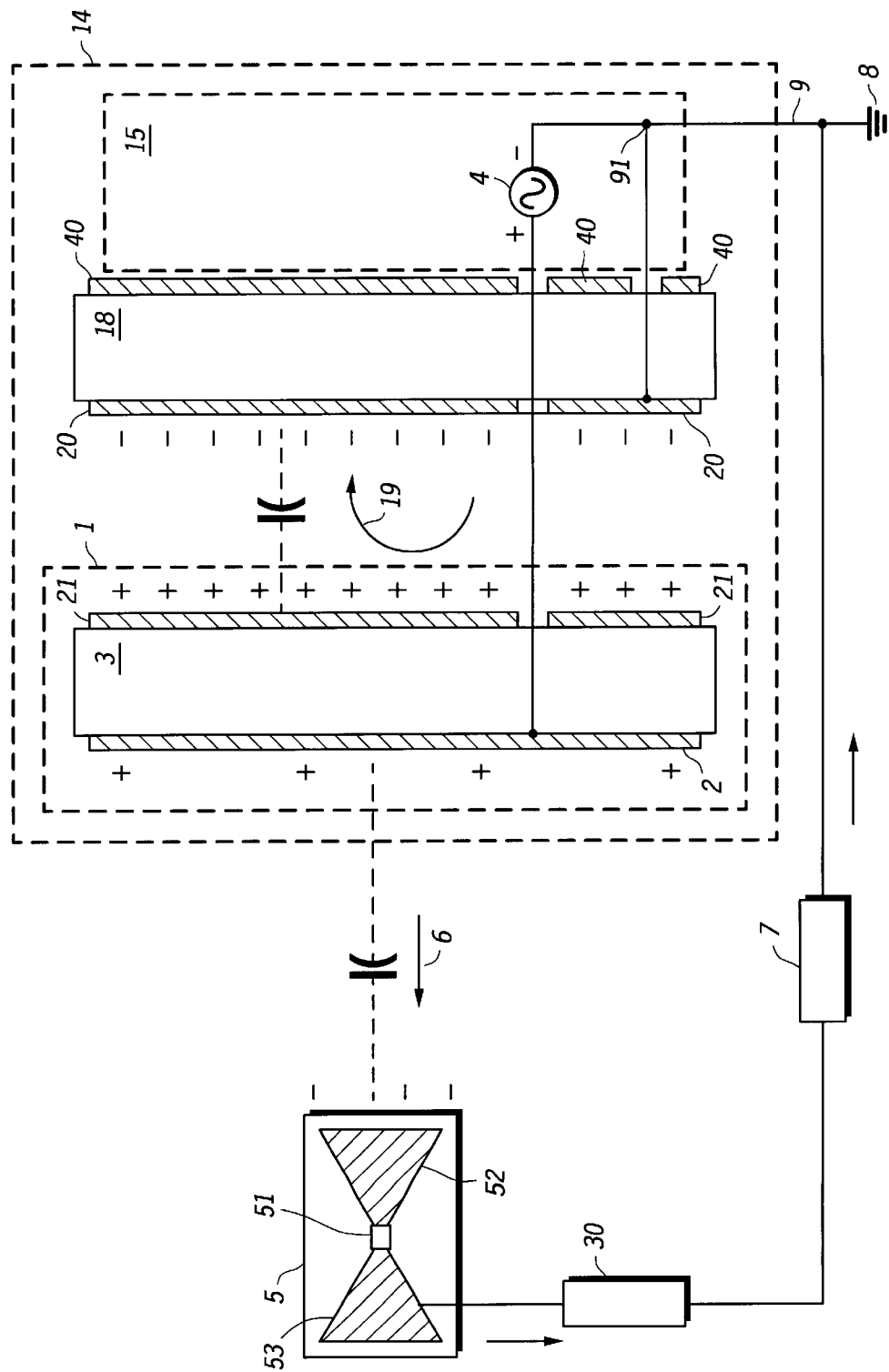
FIG. 8 illustrates the introduction of a second exciter electrode to the RFID device of FIG. 5 that is not electrically coupled to an exciter voltage source in accordance with a second embodiment of the present invention.

A second embodiment of the present invention is illustrated in FIG. 8, which is similar to FIG. 7 except that second exciter electrode 21 is not electrically coupled to exciter voltage source 4. Instead, the second exciter electrode 21 is floating (i.e., the second exciter electrode is not electrically coupled through a conductor to any electrical potential within the reader). First exciter electrode 2 is, however, still electrically coupled to exciter voltage source 4. While this second embodiment does not perform as well as the first embodiment of FIG. 7, the presence of second exciter electrode 21 still produces an increase in tag activation distance. Second exciter electrode 21 creates an electrically conductive surface that causes the potential across its entire surface to be constant, that potential being between that of exciter voltage source 4 and that of displacement current control surface 20. The second exciter electrode 21 acts to somewhat buffer or isolate first exciter electrode 2 from the adverse loading effects of displacement current control surface 20. This embodiment can provide an improvement in tag activation distance if, for example, it is undesirable to electrically couple the exciter voltage source 4 to both exciter electrodes due to packaging or manufacturing restrictions. In an alternative second embodiment, first exciter electrode 2 may be left electrically floating, while second exciter electrode 21 is electrically coupled to exciter voltage source 4. This can also yield an improvement in tag activation distance when compared to a single exciter electrode, but in general is not as productive as the first preferred embodiment in which both exciter electrodes are electrically coupled to exciter voltage source 4.

An advantage of the alternative second embodiment occurs if only one of the exciter electrodes is electrically terminated. It may be more convenient to terminate second exciter electrode 21 than to terminate first exciter electrode 2. If desired, exciter electrode 21 could be terminated through a voltage divider network (not shown) such that it develops a potential between that of exciter voltage source 4 and displacement current control surface 20.

Figure 9:
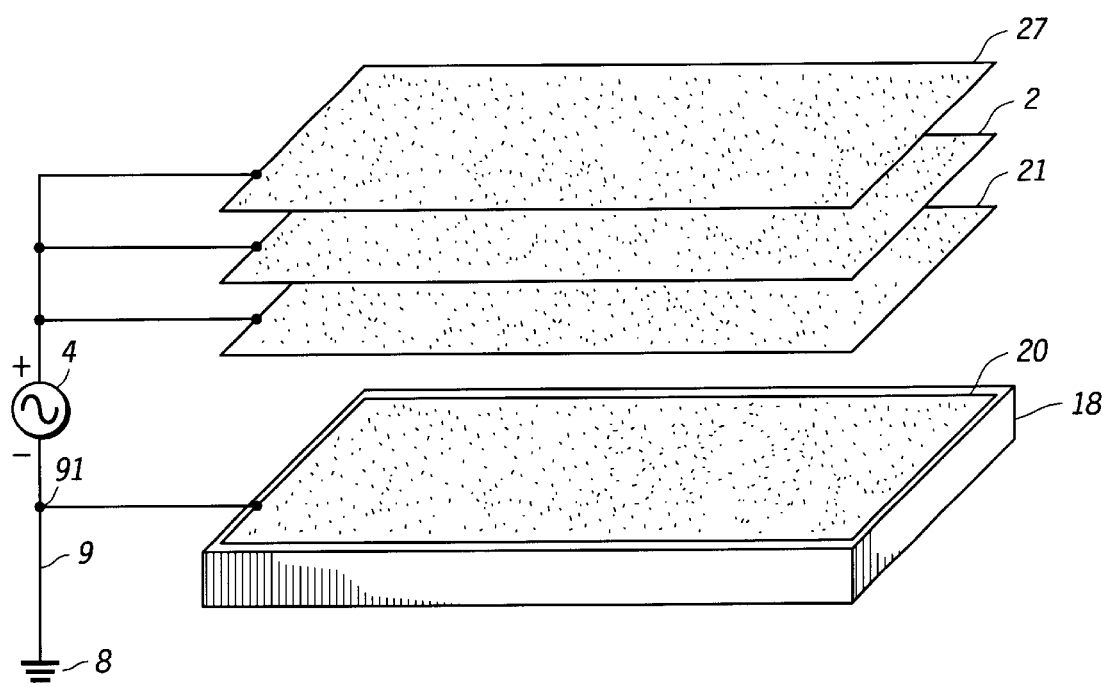
FIG. 9 illustrates the introduction of a third exciter electrode to the RFID device of FIG. 6 in accordance with a third embodiment of the present invention.

FIG. 9 illustrates a third embodiment of the invention, in which a third exciter electrode 27 is added to the electric field RFID device of FIG. 7. First exciter electrode 2, second exciter electrode 21 and third exciter electrode 27 are all electrically coupled to exciter voltage source 4. This configuration can be used to further enhance the tag activation distance. An alternative third embodiment of the invention is to use any quantity greater than one of non-coplanar exciter electrodes that may be desired to further improve tag activation distance. As described in the second embodiment of the invention, one or more additional exciter electrodes may be electrically floated if desired.

Figure 10A:
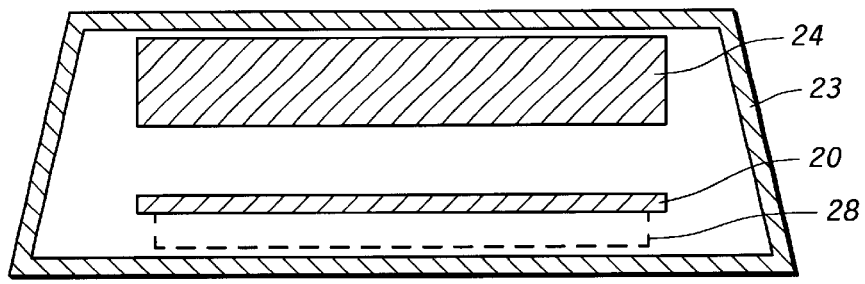
FIG. 10 illustrates the introduction of a thick single electrode to the RFID device in accordance with a fourth embodiment of the present invention.

An example of a fourth embodiment of the invention is illustrated in FIG. 10*a*, in which multiple exciter electrodes described previously are replaced with the thick single exciter electrode 24, which has a thickness equal to the total distance spanned from the outermost surface of exciter electrode 2 to the innermost surface of exciter electrode 2 in FIG. 7. Thick single exciter electrode 24 could be a continuously electrically conductive sheet, forming a conductive volume. FIG. 10*a-d* indicates the location of displacement current control surface 20, as defined previously. Other than displacement current control surface 20, the remainder of the electric field RFID device electronic circuitry is represented by the functional electronics 28, which among other elements, includes exciter voltage source 4. The front area of thick single exciter electrode 24 is unchanged from its multilayer exciter electrode counterpart. The conductive edge surfaces of thick single exciter electrode 24 are not directly exposed to tag 5 as is its front surface. However, because thick single exciter electrode 24 has continuous conducting surfaces along its edges, termination of the electric field to displacement current control surface 20 is not as extensive as in the multilayer exciter electrode examples. More electric charge is available on the edge areas of thick single exciter electrode 24, and the electric field is able to fringe outward, providing more charge to become available to tag 5.

Figure 10B:
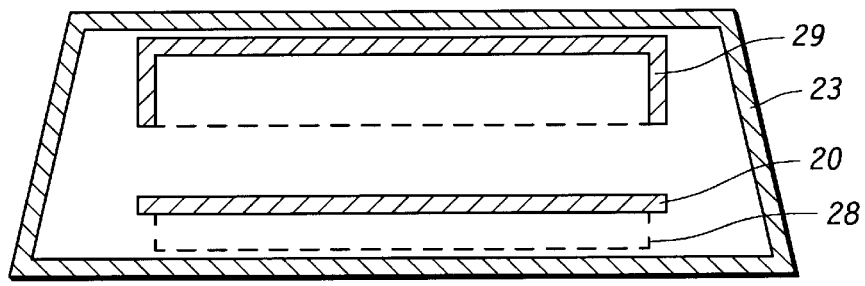
Figure 10C:
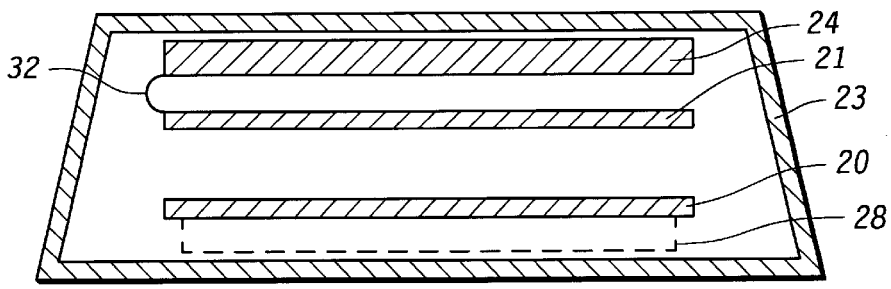
Figure 10D:
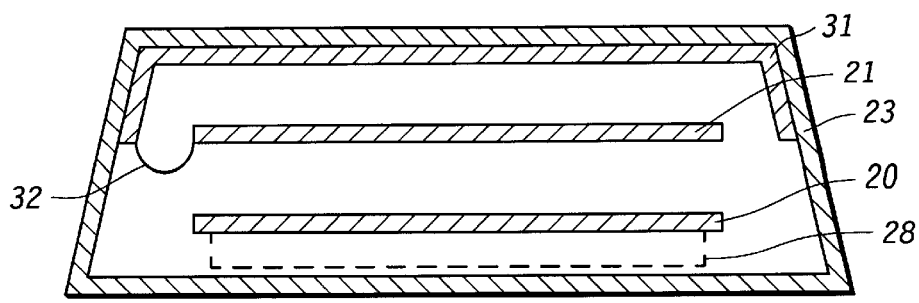

Variations of this fourth embodiment exist, such as using the five-sided conducting shell 29 instead of a six-sided box, as shown in FIG. 10*b*. Alternately, as shown in FIG. 10*c*, a combination of thick exciter electrode 24 and a thin (or thick) second exciter electrode 21 could be used as described in the preferred first embodiment. An electrically conductive exciter electrode could also be formed on the front-inside part of enclosure 23 using various processes and materials such as spray coating, sputtering deposition, flexible films, inks, etc., as illustrated in FIG. 10*d*. The first exciter electrode 31 is formed by the conductive layer disposed on the inside of enclosure 23, and is electrically coupled by the connection 32 to second exciter electrode 21, and then electrically coupled to exciter voltage source 4 (not shown). Alternatively, first exciter electrode 31 can be capacitively coupled (not shown) to second exciter electrode 21 to fulfill the intent of the present invention in a cost effective manner.

Figure 11:
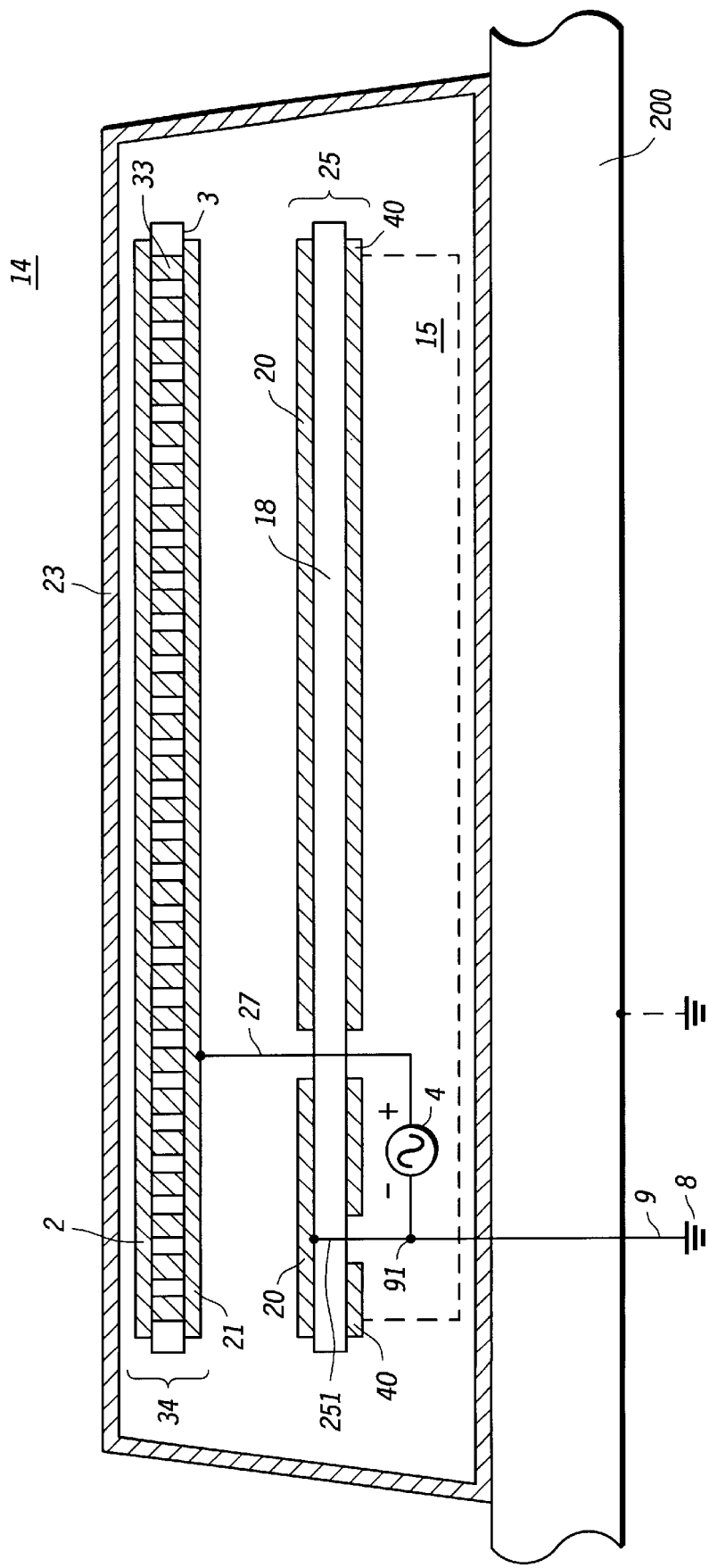
FIG. 11 illustrates a printed circuit implementation that approximates the single thick exciter electrode of FIG. 10 in accordance with the fourth embodiment of the present invention.

An approximation of the thick single exciter electrode could be implemented on a printed circuit board with two or more parallel exciter electrodes, as illustrated in FIG. 11. The thick exciter electrode 34 is comprised of PCB substrate 3, first exciter electrode 2, second exciter electrode 21, and the plurality of the conductive vias 33. Conductive vias 33 electrically couple first exciter electrode 2 to second exciter electrode 21, and are evenly distributed along all edges of the PCB, to approximate a conductive surface along its edges. If desired, additional conductive vias may be distributed internally, away from the edges of thick exciter electrode 34. It can be appreciated to one skilled in the art that many variations can be employed to produce or simulate a thick exciter electrode.

Figure 12:
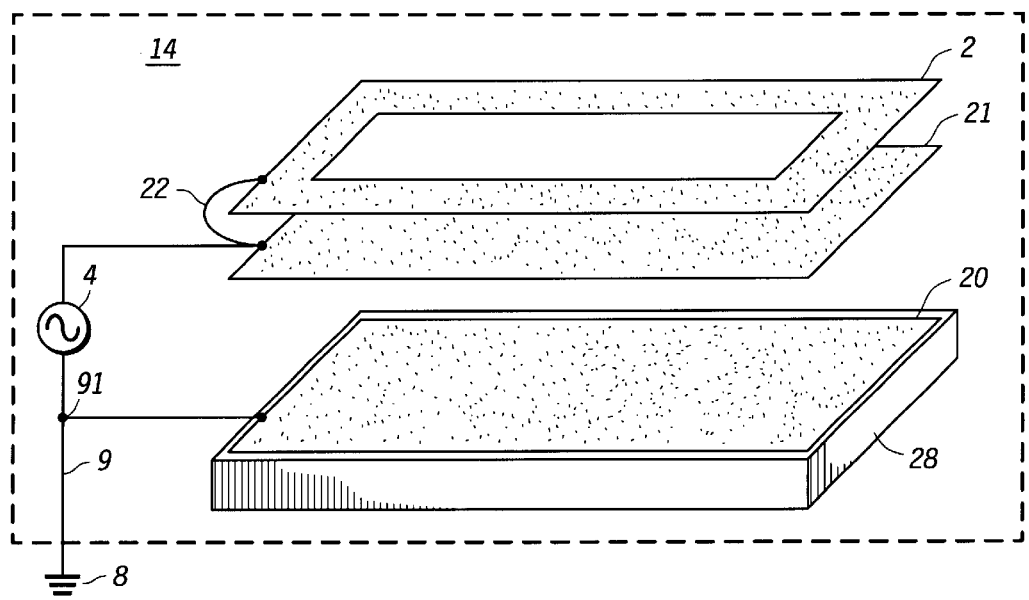
FIG. 12 illustrates non-identical geometries for the first and second exciter electrodes in accordance with a fifth embodiment of the present invention.
Figure 13:
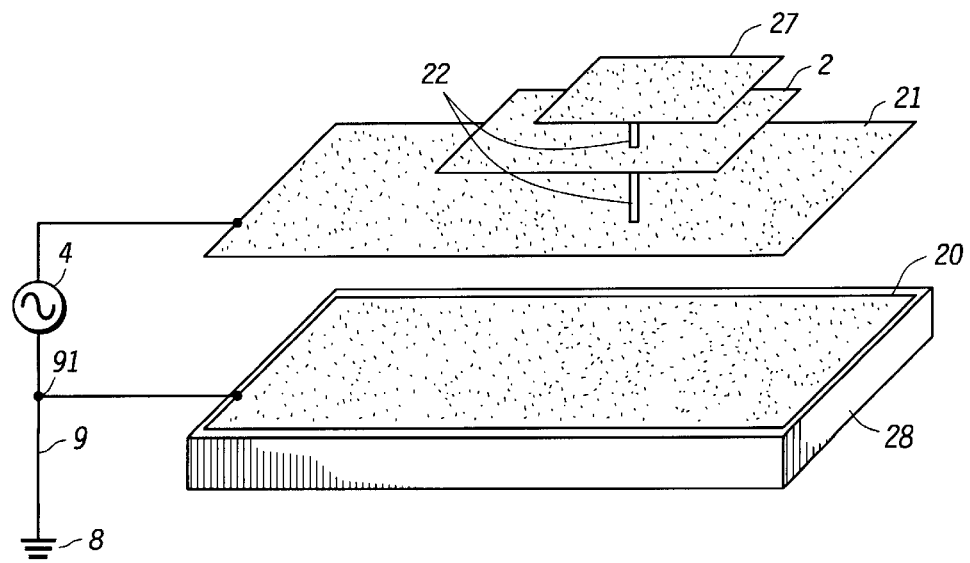
FIG. 13 illustrates non-identical geometries for the first and second and third exciter electrodes in accordance with a fifth embodiment of the invention.

A fifth embodiment of the invention is schematically represented in FIG. 12, and is characterized by non-identical geometries for first exciter electrode 2 and second exciter electrode 21. FIG. 12 indicates the location of displacement current control surface 20, as defined previously. Other than exciter electrode 2, exciter electrode 21, connection 22 and displacement current control surface 20, the remainder of the electronic circuitry contained in electric field RFID device 14 is represented by functional electronics 28, which among other elements, includes exciter voltage source 4. While only two exciter electrodes are illustrated in FIG. 12, the essence of this embodiment is not limited to only two exciter electrodes. A variety of different sizes and shapes for multiple exciter electrodes can be implemented, in varying combinations of electrical terminations to exciter voltage source 4 (not shown) and remain within the spirit of the present invention. The geometry and size of different exciter electrodes can be utilized, for example to accommodate special packaging features or restrictions. Or, non-identical geometries of exciter electrodes may be used for the purpose of controlling the shape of the tag activation volume. This may be desired, for example, if a narrow tag activation volume is required for focused reading of tags. The use of multiple exciter electrodes having differing geometries can be used to extend the tag activation distance only for localized areas, such as might be located about the central axis of an electric field RFID device. An example of this is illustrated in FIG. 13, in which first exciter electrode 2, second exciter electrode 21 and third exciter electrode 27 all differ in size. They are all electrically coupled to exciter voltage source 4 by connections 22.

Figure 14:
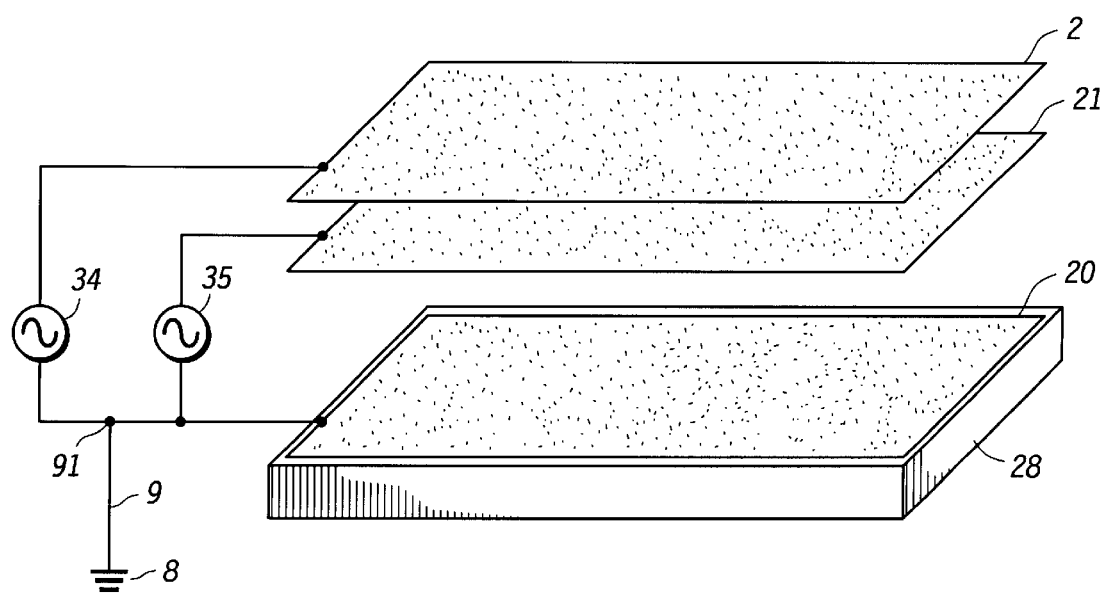
FIG. 14 illustrates utilizing multiple exciter voltage sources to drive multiple exciter electrodes in accordance with a sixth embodiment of the present invention.

A sixth embodiment of the invention utilizes multiple exciter voltage sources to drive multiple exciter electrodes. The simplest form of this is illustrated in FIG. 14 in which first exciter electrode 2 is driven by first exciter voltage source 34, and second exciter electrode 21 is driven by second exciter voltage source 35. Both exciter voltage sources 34 and 35 produce AC voltages that are of the same frequency and phase. Multiple exciter voltage sources may be utilized to allow the physical distribution excitation voltage to optimize circuit design and packaging constraints. This configuration can be used to control the potential applied to first exciter electrode 2 independently of second exciter electrode 21. For example, first exciter voltage source 34 may be varied in response to the magnitude of the received tag signal or external loading, so the radiated power can be dynamically controlled. By keeping the drive on second exciter electrode 21 constant, the loading effects of displacement current control surface 20 may be managed independently. By combining different exciter electrode geometries with different exciter voltage sources, greater control over the tag activation volume can be achieved.

A seventh embodiment of the invention is similar to the sixth embodiment, except that the multiple exciter voltage sources can differ from one another in amplitude or phase or both in order to further alter the shape of the effective tag activation volume. This can be used to focus or spread the field, or to limit radiated emissions at distances greater than the read area. Also, the multiple exciter voltage sources can vary from one another in frequency if desired and remain within the spirit of the present invention.

An eighth embodiment of the invention is similar to the sixth and seventh embodiments, except that the magnitude and phase of multiple exciter voltage sources are dynamically varied to alter the effective tag activation volume, position, or both. This could be used, for example, to scan an area for tags that occupy different physical locations within the environment of the electric field RFID device. For example, the voltage applied to exciter electrodes used to buffer other exciter electrodes from the adverse effects of nearby electrically conductive surfaces could be dynamically reduced to cause tag activation distance in those specific location(s) to also be reduced.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, it can be appreciated by those of ordinary skill in the art that one or more embodiments of this invention can be combined with other exciter electrode structures, such as multiple co-planer electrodes to obtain an even greater degree of spatial tag activation volume, shape and position control. The present invention could be fully integrated into a single multilayer PCB, for example, combining multiple exciter electrodes, displacement current control surface and electronic circuitry into one assembly to realize low cost compact electric field RFID devices. Thus, it should be understood that the present invention is not limited by the foregoing description, but embraces all such alterations, modifications and variations in accordance with the spirit and scope of the appended claims.

I claim:

1. A radio frequency identification ("RFID") reader for increasing tag activation distance, the RFID reader comprising:

at least a first exciter electrode and a second exciter electrode, the second exciter electrode positioned behind the first exciter electrode;

a dielectric substrate disposed between the first and second exciter electrodes, and isolating the first exciter electrode from the second exciter electrode; and a first exciter voltage source coupled to at least one of the first exciter electrode and the second exciter electrode for generating an electric field that radiates in a front portion of the RFID reader.

2. The RFID reader of claim 1 wherein the first exciter voltage source is coupled to the first exciter electrode, and further comprising a second exciter voltage source coupled to the second exciter electrode.

3. The RFID reader of claim 2 wherein the first exciter voltage source produces alternating currents in phase with the second exciter voltage source.

4. The RFID reader of claim 2 wherein the first exciter voltage source produces alternating currents out of phase with the second exciter voltage source.

5. The RFID reader of claim 2 wherein the first exciter voltage source and the second exciter voltage sources produce alternating currents at the same frequencies.

6. The RFID reader of claim 2 wherein the first exciter voltage source and the second exciter voltage source produce alternating currents at different frequencies.

7. The RFID reader of claim 2 wherein the first exciter voltage source and the second exciter voltage source produce alternating currents at different voltages.

8. The RFID reader of claim 2 wherein the first exciter voltage source and the second exciter voltage source produce alternating currents at the same voltages.

9. The RFID reader of claim 1 further comprising a conductor connecting the first exciter electrode to the second exciter electrode.

10. The RFID reader of claim 1 wherein the dielectric substrate is a printed circuit board.

11. The RFID reader of claim 1 wherein the first exciter electrode and the second exciter electrode have non-identical geometries.

12. The RFID reader of claim 1 wherein the first exciter electrode and the second exciter electrode have identical geometries.

13. The RFID reader of claim 1 wherein the first exciter electrode and the second exciter electrode are not coplanar.

14. The RFID reader of claim 1 wherein the first exciter electrode is electrically coupled to the first exciter voltage source, and the second exciter electrode is not electrically coupled through a conductor to any electrical potential within the RFID device.

15. The RFID reader of claim 1 wherein the first exciter electrode is electrically coupled to the first exciter voltage source, and the second exciter electrode is electrically coupled to a voltage divider.

16. The RFID reader of claim 1 further comprising electronic circuitry coupled to the first exciter electrode and the second exciter electrode.

17. A radio frequency identification ("RFID") reader for increasing tag activation distance, the RFID device comprising:

at least a first exciter electrode and a second exciter electrode, the first and second exciter electrodes electrically coupled continuously along their edges to form a conductive volume; and a first exciter voltage source coupled to the first and second exciter electrodes for generating an electric field that radiates in a front portion of the RFID reader.

18. The RFID reader of claim 17 wherein the electrical connection and the first and second exciter electrodes are formed in a continuous electrically conductive sheet without any intervening dielectric material.

19. A method for increasing tag activation distance in a radio frequency identification ("RFID") reader, the method comprising:

providing at least a first exciter electrode and a second exciter electrode;

positioning the second exciter electrode behind the first exciter electrode;

disposing a dielectric substrate between the first and second exciter electrodes; and electrically coupling a first exciter voltage source to at least one of the first exciter electrode and the second exciter electrode for generating an electric field that radiates in a front portion of the RFID reader.

20. The method of claim 19 wherein the step of disposing comprises isolating the first exciter electrode from the second exciter electrode.

21. The method of claim 19 further comprising electrically coupling the first exciter electrode to the second exciter electrode.

22. The method of claim 19 further comprising dynamically varying at least one of a magnitude and phase of the first exciter voltage source.

* * * * *